US012072460B2

(12) United States Patent
Yoo et al.

(10) Patent No.: US 12,072,460 B2
(45) Date of Patent: Aug. 27, 2024

(54) SYSTEM AND METHOD FOR DETERMINING A SET OF FIRST BREAKS OF A SEISMIC DATASET

(71) Applicant: SAUDI ARABIAN OIL COMPANY, Dhahran (SA)

(72) Inventors: Jewoo Yoo, Delft (NL); Roald van Borselen, Voorschoten (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 305 days.

(21) Appl. No.: 17/644,397

(22) Filed: Dec. 15, 2021

(65) Prior Publication Data
US 2023/0184977 A1    Jun. 15, 2023

(51) Int. Cl.
*G01V 1/34*     (2006.01)
*E21B 49/00*    (2006.01)
(Continued)

(52) U.S. Cl.
CPC .............. *G01V 1/345* (2013.01); *E21B 49/00* (2013.01); *G01V 1/003* (2013.01); *G01V 1/303* (2013.01);
(Continued)

(58) Field of Classification Search
CPC ........ G01V 1/345; G01V 1/003; G01V 1/303; G01V 2210/6222; G01V 2210/74
See application file for complete search history.

(56) References Cited

U.S. PATENT DOCUMENTS 5,181,171 A    1/1993   McCormack et al.
5,920,828 A    7/1999   Norris et al.
(Continued)

FOREIGN PATENT DOCUMENTS

CN    107957592 A    4/2018
CN    106842325 B    2/2019
(Continued)

OTHER PUBLICATIONS

Sabbione, J. I. et al. "Automatic first-breaks picking: New strategies and algorithms" 2010 Geophysics, 75, No. 4, V67-V76 (10 pages).
(Continued)

*Primary Examiner* — Manuel A Rivera Vargas
(74) *Attorney, Agent, or Firm* — Osha Bergman Watanabe & Burton LLP

(57) ABSTRACT

A system and method for determining a set of first breaks of a seismic dataset are disclosed, the method including obtaining the seismic dataset composed of a plurality of seismic traces and a provisional first break for each seismic trace. The method further includes selecting a plurality of proximal picks for each seismic trace, determining a near-offset pick for each seismic trace starting with shortest offset and sequentially selecting traces in order of increasing offset, and determining a far-offset pick for each seismic trace starting with the farthest offset and sequentially selecting traces in order of decreasing offset. The method further includes determining a set of coincident picks based on the near-offset and the far-offset picks for each seismic trace, fitting a curve to the set of coincident picks, and determining the set of first breaks of the seismic dataset from the curve.

14 Claims, 10 Drawing Sheets

(51) Int. Cl.
  *G01V 1/00* (2006.01)
  *G01V 1/30* (2006.01)
(52) U.S. Cl.
  CPC ............... *G01V 2210/1295* (2013.01); *G01V 2210/1425* (2013.01); *G01V 2210/6222* (2013.01); *G01V 2210/74* (2013.01)

(56) References Cited

U.S. PATENT DOCUMENTS

| | | | |
|---|---|---|---|
| 11,221,425 B1* | 1/2022 | He | G01V 1/303 |
| 2011/0010098 A1 | 1/2011 | Zhan et al. | |
| 2015/0109885 A1 | 4/2015 | Nowak et al. | |
| 2015/0177402 A1 | 6/2015 | Al-Shuhail et al. | |
| 2016/0377751 A1 | 12/2016 | De Meersman et al. | |
| 2017/0068008 A1 | 3/2017 | Colombo et al. | |
| 2019/0302298 A1 | 10/2019 | Colombo et al. | |
| 2019/0324167 A1 | 10/2019 | Zhang | |
| 2020/0241159 A1 | 7/2020 | Willis et al. | |

FOREIGN PATENT DOCUMENTS

| | | |
|---|---|---|
| CN | 108072896 B | 8/2019 |
| GB | 2379505 B | 10/2004 |
| WO | 2017035104 A1 | 3/2017 |

OTHER PUBLICATIONS

Hampson, Dan et al. "First-break interpretation using generalized linear inversion" SEG Technical Program Expanded Abstracts 1984, Society of Exploration Geophysicists, 1984, pp. 532-534 (3 pages).
McCormack, Michael D. et al. "First-break refraction event picking and seismic data trace editing using neural networks." Geophysics 58.1 (1993) pp. 67-78 (12 pages).
Molyneux, Joseph B. et al. "First-break timing: Arrival onset times by direct correlation" Geophysics 64.5 (1999) 1492-1501 (10 pages).
Khalaf, Amin et al. "Development of an adaptive multi-method algorithm for automatic picking of first arrival times: application to near surface seismic data" Near Surface Geophysics, 2018 (20 pages).
Duan, Xudong et al. "Multitrace first-break picking using an integrated seismic and machine learning method" Geophysics, vol. 85, No. 4 (Jul.-Aug. 2020); p. WA269-WA277 (9 pages).
Xu, Yinpo et al. "High Accurate Automated First Break Picking Method for Seismic Records from High Density Acquisition in the Areas with Complex Surface" Southwest Petroleum University, Sichuan Province Natural Gas Geology Key Laboratory, doi:10.1111/1365-2478.12923 (80 pages).
Colombo et al., "Fully automated near-surface analysis by surface-consistent refraction method," Geophysics, vol. 81, No. 4, Jul.-Aug. 2016, pp. U39-U49, 11 pages.
Y. Luo and G.T. Schuster, "Wave-equation traveltime inversion," Geophysics, vol. 56, No. 5, May 1991, pp. 645-653, 9 pages.
Saudi Arabian Office Action Issued in Corresponding Application No. 122440865, dated May 29, 2024, 16 pages.

* cited by examiner

SYSTEM AND METHOD FOR DETERMINING A SET OF FIRST BREAKS OF A SEISMIC DATASET

BACKGROUND

Seismic surveys produce images of subsurface geology and can be used to determine the location and size of possible oil and gas reservoirs. During a seismic survey, seismic waves propagate through the earth's subsurface, producing a seismic record, or seismic trace, at each seismic receiver. Seismic waves are elastic vibrations or disturbances that radiate from a seismic source. A seismic source is a device that provides energy for seismic data acquisition, such as an explosive charge. Seismic waves may be partially reflected when they encounter a surface across which an impedance contrast exists. If seismic waves are reflected, they may be subsequently detected by a seismic receiver. Each seismic trace represents the signal detected by a seismic receiver.

A first break ("FB") time or "pick" is the time at which the first seismic wave radiated from the seismic source is detected on the seismic trace. The FB pick may play an important role in subsequent processing of the seismic trace to determine an image of the subsurface geology. For example, FB picks may be used in statics determination and tomography. Typically, FB picks are required for hundreds of thousands of seismic traces, thereby constituting a set of first breaks, and consequently automation of the task of FB picking is desirable. Often approximate or noisy FB picks may be determined first and they may require later refinement or correction.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of determining a set of first breaks of a seismic dataset generated by a seismic source. The method includes, obtaining a seismic dataset, including a plurality of seismic traces and a provisional first break for each of the plurality of seismic traces, and selecting a plurality of proximal picks for each seismic trace, with each proximal pick lying within a time window enclosing the provisional first break. The method further includes determining a near-offset pick for a seismic trace with a shortest offset and sequentially selecting, in order of increasing offset, a selected trace and determining the near offset pick for the selected trace based on proximal picks of the selected trace and the near-offset pick for at least one seismic trace with a shorter offset than the selected trace. The method further includes determining a far-offset pick for a seismic trace with a farthest offset and sequentially selecting, in order of decreasing offset, a selected trace and determining a far-offset pick for the selected trace based on the proximal picks of the selected trace and the far-offset pick for at least one seismic trace with a farther offset than the selected trace. The method still further includes determining a set of coincident picks based on the near-offset pick and the far-offset pick for each seismic trace, fitting a first break curve to the set of coincident picks, and determining the set of first breaks of the seismic dataset, based, at least in part, on the first break curve.

In general, in one aspect, embodiments relate to a non-transitory computer readable medium storing instructions executable by a computer processor. The instructions include functionality for receiving a seismic dataset generated by a seismic source, including a plurality of seismic traces and a provisional first break for each of the plurality of seismic traces, and selecting a plurality of proximal picks for each seismic trace, with each proximal pick lying within a time window enclosing the provisional first break. The instructions further include functionality for determining a near-offset pick for a seismic trace with a shortest offset and sequentially selecting, in order of increasing offset, a selected trace and determining the near offset pick for the selected trace based on proximal picks of the selected trace and the near-offset pick for at least one seismic trace with a shorter offset than the selected trace. The instructions further include functionality for determining a far-offset pick for a seismic trace with a farthest offset and sequentially selecting, in order of decreasing offset, a selected trace and determining a far-offset pick for the selected trace based on the proximal picks of the selected trace and the far-offset pick for at least one seismic trace with a farther offset than the selected trace. The instructions still further include functionality for determining a set of coincident picks based on the near-offset pick and the far-offset pick for each seismic trace, fitting a first break curve to the set of coincident picks, and determining the set of first breaks of the seismic dataset, based, at least in part, on the first break curve.

In general, in one aspect, embodiments relate to a system including a seismic acquisition system and a seismic processor. The seismic processor is configured to receive a seismic dataset generated by a seismic source, including a plurality of seismic traces and a provisional first break for each of the plurality of seismic traces, and select a plurality of proximal picks for each seismic trace, with each proximal pick lying within a time window enclosing the provisional first break. The seismic processor is further configured to determine a near-offset pick for a seismic trace with a shortest offset and sequentially select, in order of increasing offset, a selected trace and determine the near offset pick for the selected trace based on proximal picks of the selected trace and the near-offset pick for at least one seismic trace with a shorter offset than the selected trace. The seismic processor is further configured to determine a far-offset pick for a seismic trace with a farthest offset and sequentially select, in order of decreasing offset, a selected trace and determine a far-offset pick for the selected trace based on the proximal picks of the selected trace and the far-offset pick for at least one seismic trace with a farther offset than the selected trace. The seismic processor is still further configured to determine a set of coincident picks based on the near-offset pick and the far-offset pick for each seismic trace, fit a first break curve to the set of coincident picks, and determine the set of first breaks of the seismic dataset, based, at least in part, on the first break curve.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
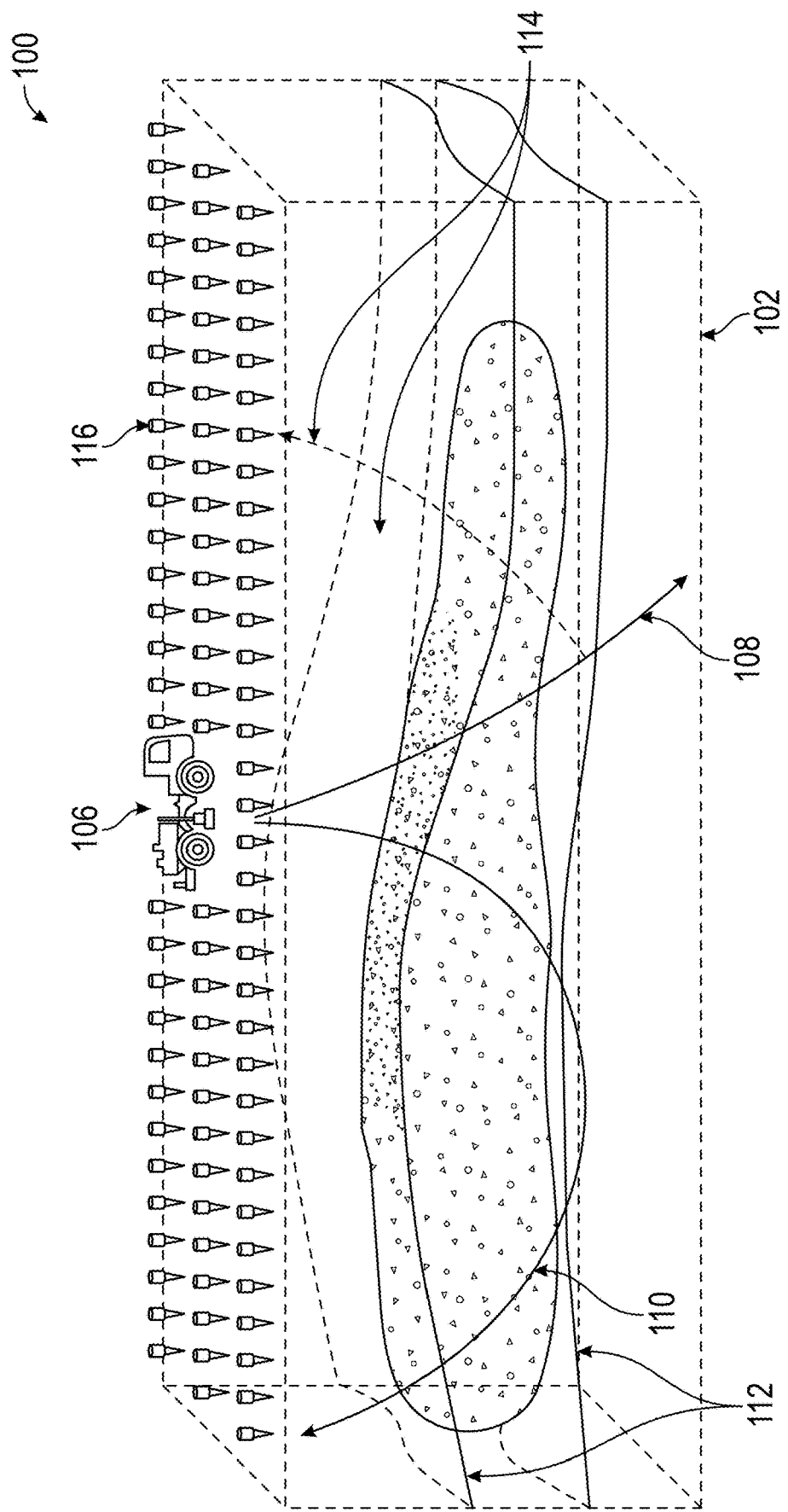
FIG. 1 depicts elements of a seismic survey in accordance with one or more embodiments.

FIG. 1 depicts elements of a seismic survey in accordance with one or more embodiments. In a seismic survey, energy in the form of seismic waves is generated by the seismic source (106) which may be partially reflected (114) when encountering a surface across which an impedance contrast exists, and may be subsequently detected by a seismic receiver (116). Reflected seismic waves are useful for mapping and evaluating subterranean regions of interest (102), including geological discontinuities (112) and possible hydrocarbon accumulations. The energy contained in seismic waves may also be refracted (110), or "bent," when passing through a subsurface boundary. Seismic waves may also be radiated (108) into subsurface layers.

Figure 2:
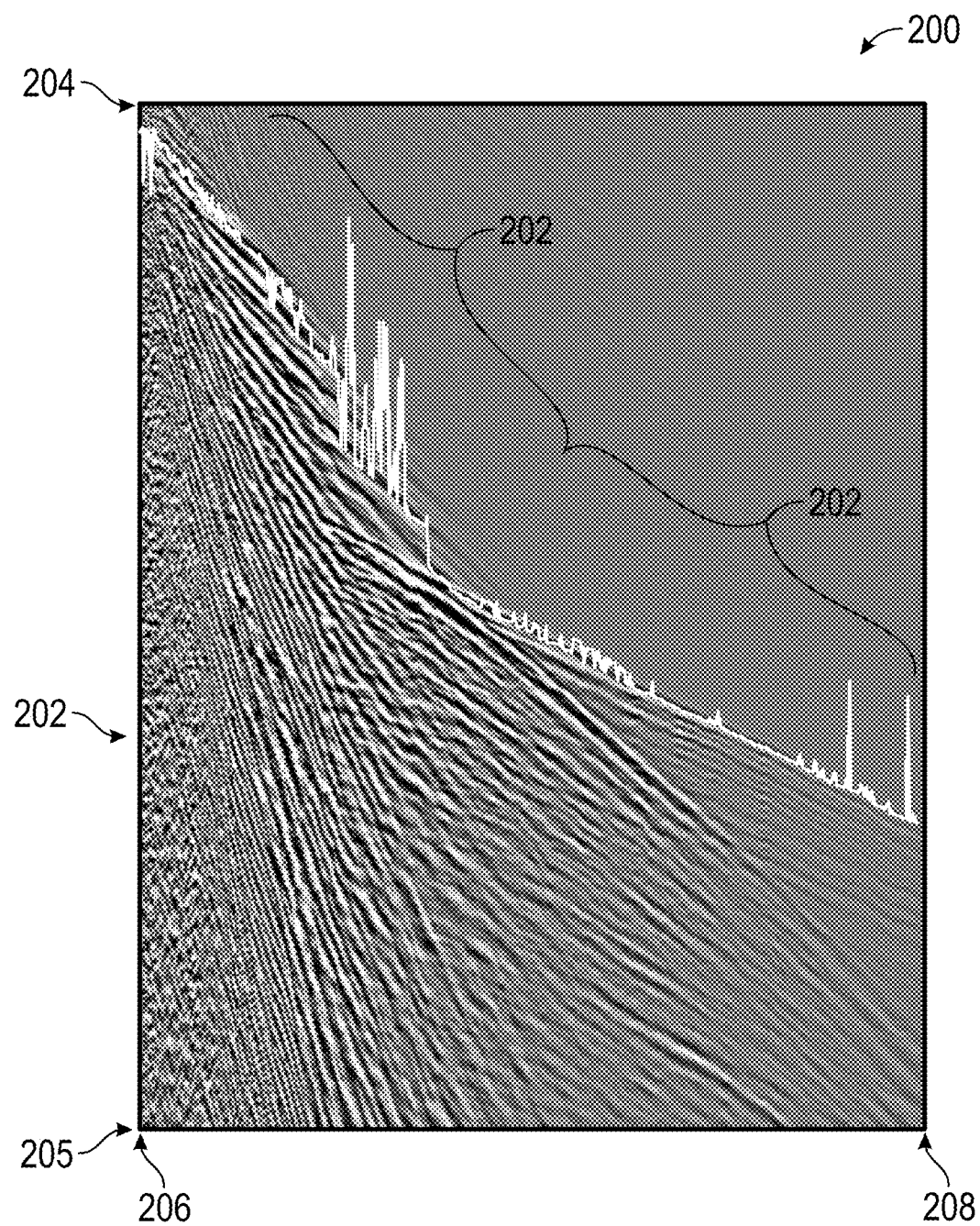
FIG. 2 shows a seismic dataset and initial first breaks in accordance with one or more embodiments.

FIG. 2 shows a seismic dataset (200) in accordance with one or more embodiments. A seismic dataset (200) is produced by the seismic survey (100). The seismic dataset includes a plurality of seismic traces, each recorded by a single seismic receiver (116). The seismic receivers (116) are located at a range of distances ("offsets") from the seismic source (106). The range of distances extends from a minimum offset (206) to a maximum offset (208). FIG. 2 displays each seismic trace vertically with recording time increasing along a time axis (202) from a minimum recording time (204) to a maximum recording time (205). The seismic traces are ordered by monotonically increasing offset from the minimum offset at the left of FIG. 2 to the maximum offset at the right of FIG. 2.

FIG. 2 further shows the set of initial first breaks (202), depicted by a white line, in accordance with one or more embodiments. Each initial first break, $t_{fi}$ (202) approximates the time at which the seismic wave is first detected by the corresponding seismic receiver (116). However, a person of ordinary skill in the art will readily appreciate that the set of initial first break (202) may contain a plurality of noisy or erroneous values.

Figure 3:
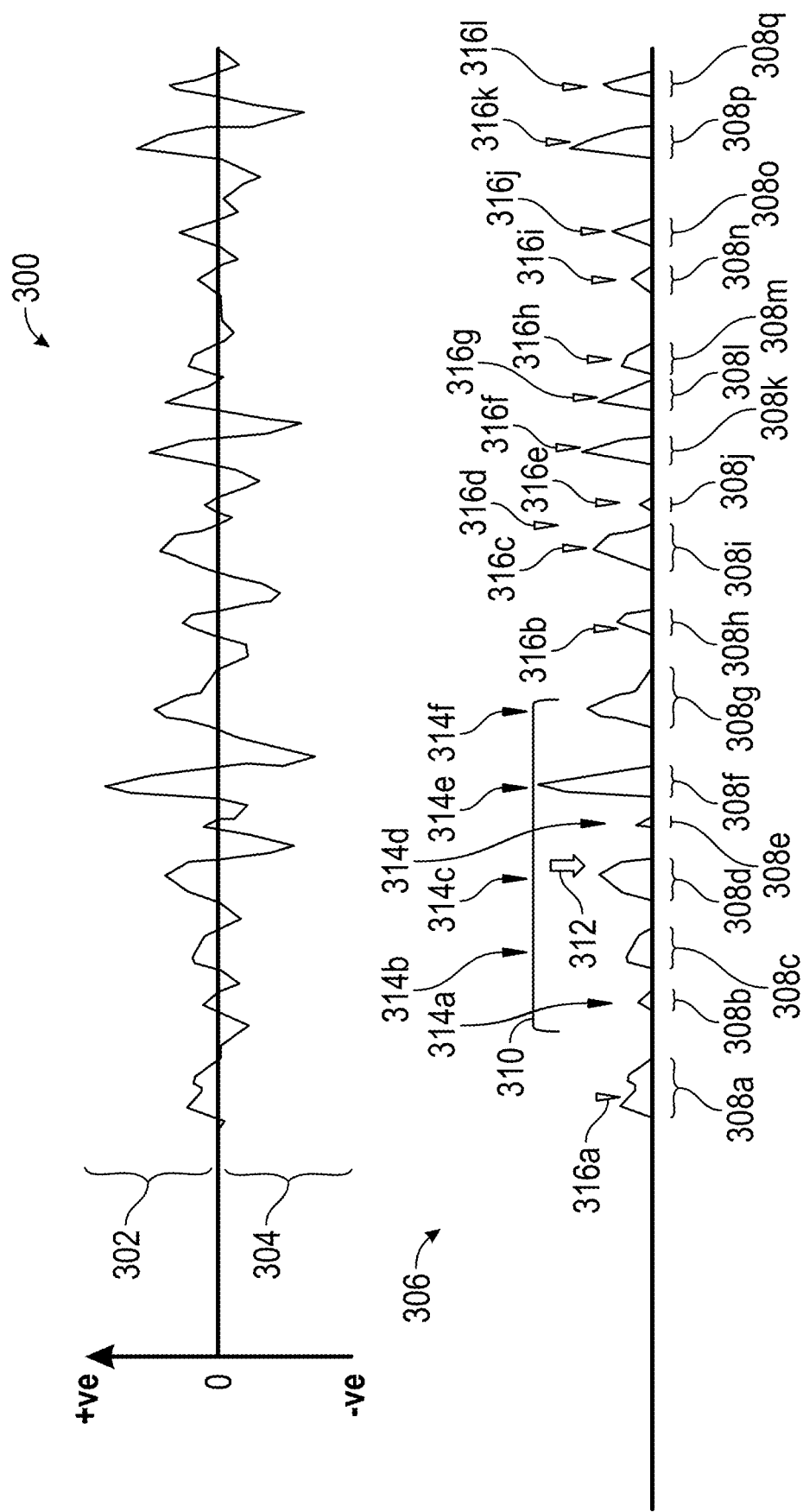
FIG. 3 depicts a seismic trace and a positive trace determined from the seismic trace, in accordance with one or more embodiments.

FIG. 3 depicts a seismic trace (300) and a positive trace (306) determined from the seismic trace, in accordance with one or more embodiments. The seismic trace (300) includes a series of samples at various recording times. The recording times are typically sampled at regular time intervals. Each sample of the seismic trace (300) records the amplitude of the vibration caused by seismic waves at the location of the seismic receiver (116) at the time the sample is taken. The amplitudes may have positive values (302) or negative values (304) at different times along the seismic trace (300), shown as positive or negative deviations from zero along the seismic trace (300).

In accordance with one or more embodiments, the positive trace (306) includes only those portions of the seismic trace (300) with amplitudes greater than zero. Each continuous segment ("lobe") of the positive trace (306) is shown as a black shaded lobe (308a-308q) on the positive trace (306). From each lobe (308a-308q), a centroid time, $t_c$, may be computed, as:

$$t_c = t_s + \frac{\int_{t_s}^{t_e} (t - t_s) w(t) u(t) dt}{\int_{t_s}^{t_e} w(t) u(t) dt} \qquad \text{Equation (1)}$$

where $t_s$ is the start time of the lobe, $t_e$ is the end time of the lobe, u(t) is the amplitude of the positive trace, and w(t) is a weighting function.

In accordance with other embodiments, a centroid mask trace, $C(t_c^i)$, may be calculated as:

$$C(t_c^i) = \begin{cases} 1 & \text{when } l^i \geq l^{avg} \\ 0 & \text{else} \end{cases} \qquad \text{Equation (2)}$$

where $l^i$ is the length of the $i^{th}$ lobe, and $l^{avg}$ is the average length of lobe in the positive trace. The center of each lobe, $t_c^i$, may be determined as:

$$t_c^i = t_s^i + (t_e^i - t_s^i)/2 \qquad \text{Equation (3)}$$

where $t_s^i$ is the start time of the $i^{th}$ lobe and $t_e^i$ is the end time of the $i^{th}$ lobe. The length of the i-th lobe, $l^i$, may be determined as:

$$l^i = t_e^i - t_s^i, \qquad \text{Equation (4)}$$

and the average length, $l^{avg}$, of all the lobes in a trace as:

$$l^{avg} = (\Sigma_i t_e^i - t_s^i)/i. \qquad \text{Equation (5)}$$

FIG. 3 shows a first break (312) and a plurality of centroid times (316a-1, 314a-f) for the positive trace (306). A subset of the plurality of centroid times may be designated proximal picks (314a-f) and. Each proximal pick, $p_2$, (314a-f) may lie within a time window (310) that encloses the first break (312). The time window (310) may be disposed symmetrically around the first break (312).

In accordance with one or more embodiments, The proximal picks, (314a-f) may include a proximal pick, $t_1$, (314c) that is the centroid time closest to the first break (312) in time that may be computed as:

$$t_1 = \operatorname{argmin}(\sqrt{(t_f - C(t) \cdot t)^2}), \quad 0 \leq t \leq t_{length} \quad \text{Equation (6)}$$

where c is the centroid time, t is time, and $t_{length}$ is the duration of the trace. Further, the proximal picks (314a-f) may include a proximal pick (314b) that is the centroid time closest in time, but earlier than, $t_1$. This proximal pick time may be denoted $t_2$ and may be computed as:

$$t_2 = \operatorname{argmin}(\sqrt{(t_1 - C(t) \cdot t)^2}), \quad 0 \leq t \leq t_1 \quad \text{Equation (7)}$$

Further still, the proximal picks (314a-f) may include a proximal pick (314d) that is the centroid time closest in time, but later than, $t_1$. This proximal pick time may be denoted $t_3$ and may be computed as:

$$t_3 = \operatorname{argmin}(\sqrt{(t_1 - C(t) \cdot t)^2}), \quad t_1 \leq t \leq t_{length} \quad \text{Equation (8)}$$

Thus, a proximal pick array, denoted $p_2$, may be computed as:

$$p_2(t, x) = \begin{cases} 1 & \text{when } t \in \{t_1(x), t_2(x), t_3(x)\} \\ 0 & \text{else} \end{cases} \quad \text{Equation (9)}$$

In accordance worth one or more embodiments the entries in the proximal pick array may be extended to include other centroid times (314a, b and 314e, f) that lie within the time window (310). A local extension algorithm may be used to extend the set of proximal picks. For example, if the value obtained from calculating proximal picks (314a-f) is non-zero, no additional proximal picks are added. However, if the value obtained from calculating proximal picks (314a-f) is zero but a continuous centroid time exists the continuous extension time may be chosen.

Figure 4B:
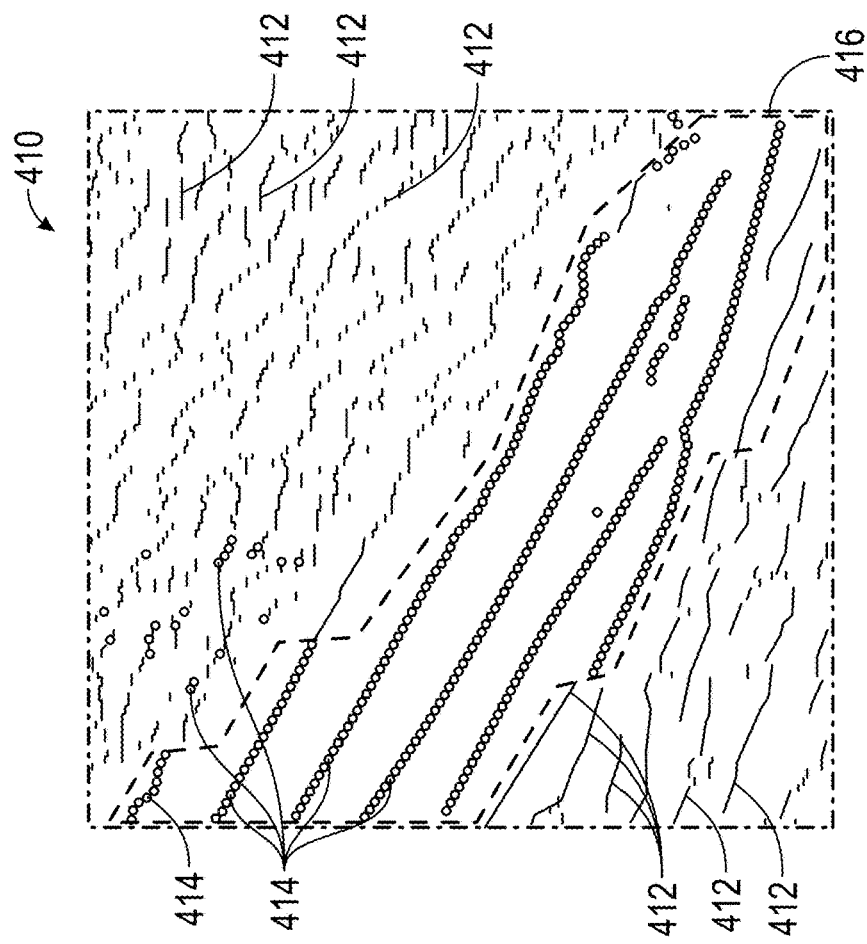
FIG. 4B shows a subset of the positive centroid dataset in accordance with one or more embodiments.
Figure 4A:
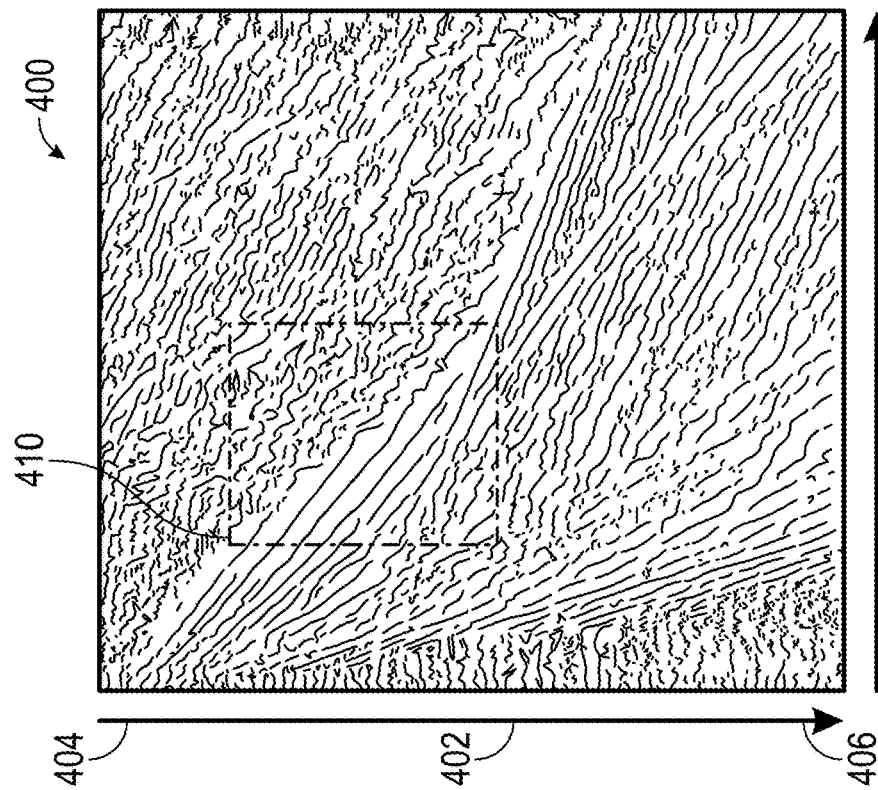
FIG. 4A shows a centroid time dataset determined from the seismic dataset, in accordance with one or more embodiments.

FIG. 4A shows a centroid time dataset (400) determined from the seismic dataset (200), in accordance with one or more embodiments. The centroid times are computed by determining a positive trace for each seismic trace and determining a centroid time for each lobe of the positive trace. The vertical axis (402) of the positive centroid dataset (400) indicates recording time increasing from a minimum recording time (404) to a maximum recording time (406). The horizontal axis (408) indicates the offset of the positive traces, monotonically increasing from the minimum offset to the left to the maximum offset to the right. Each dot in the positive centroid dataset (400) represent one centroid time. FIG. 4A further shows a subset (410) of the positive centroid dataset (400) that is further displayed in FIG. 4B.

FIG. 4B shows a subset (410) of the positive centroid dataset (400) in accordance with one or more embodiments. FIG. 4B shows centroid times (412) indicated by dark gray dots, and proximal times (414) indicated by light gray dots. Most proximal times (414) are located in a portion (416) running from earlier times at shorter offsets to longer times at farther offsets. However, some proximal times (414) lie outside the portion (416). The outlier proximal times may be determined by outlier values of the initial first breaks (202).

Figure 5:
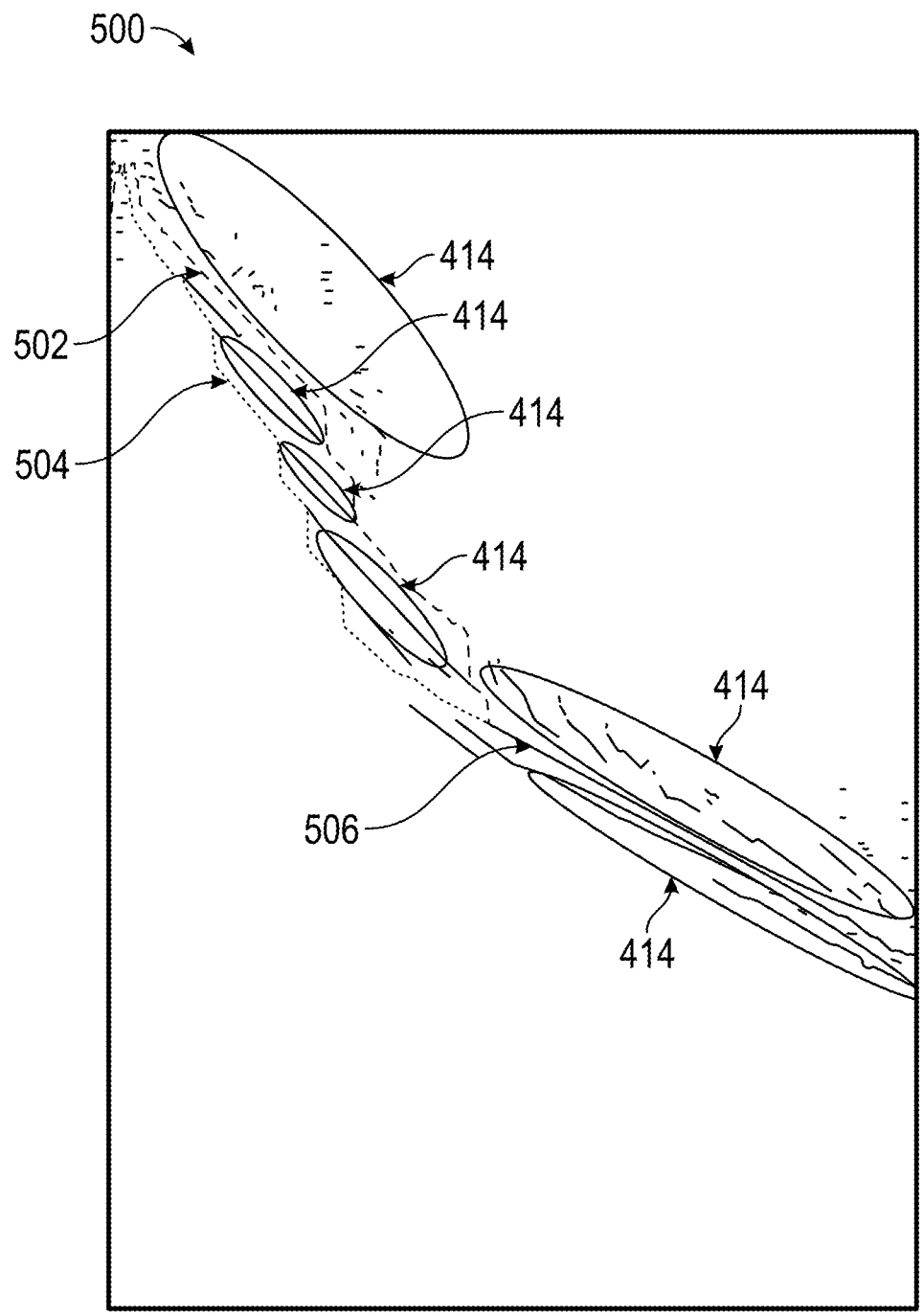
FIG. 5 shows proximal times, near-offset picks, far-offset picks, and coincident picks, in accordance with one or more embodiments.

FIG. 5 shows proximal times (414), near-offset picks (502), far-offset picks (504), and coincident picks (506) in accordance with one or more embodiments. Near-offset picks (502) are determined from proximal times (414) beginning with the proximal times (414) with the shortest offsets and progressing to the longest offsets by iteratively selecting from proximal picks (414) in order of monotonically increasing offset. Far-offset picks (504) are determined from proximal times (414) beginning with the proximal times (414) with the longest offsets and progressing to the shortest offset by iteratively selecting from proximal picks (414) in order of monotonically decreasing offsets.

The near-offset picks (502) and far-offset picks (504) are each determined such that the picks vary smoothly from one trace to the next. A near-offset may be determined from the proximal picks of a trace based, at least in part, on the value of near-offset picks (502) already determined for adjacent traces. For example, near-offset picks (502) and far-offset picks (504) may be determined based on the following algorithm:

```
Input: p(x, t) = 1 for sample with t = a proximal pick time; otherwise zero
        dt = time sampling rate of seismic data
        off(x) = offset information
Output: l(x) = near-offset pick for each trace
1:      x_0 ← the spatial index of starting point
2:      t_0 ← the time index of starting point
3:      n ← the number of traces
4:      nt ← the number of time samplings
5:      for x = 0 to x = n do
6:          for t = 0 to t= nt do
7:              if p(x, t) ≠ 0 then
8:                  for l = 0 to l = 20 do
9:                      v_0 = off(x_0)/(t_0 · dt)
10:                     v = off(x)/(t · dt)
11:                     b_x = |off(x) − off(x_0)|/|(v + v_0)/3. |
12:                     b_t = dt
13:                     dist(l, t) = [{(x − l) − x_0} · b_x]² + [{(t − t_0)} · b_t]²
14:                 end for
15:             end if
16:         end for
17:         (l' ,t' ) = arg min dist(l, t)
18:         x_0 ← x − l'
19:         t_0 ← t'
20:         l(x) ← t_0
21:     end for
```

Near-offset picks (502) may be determined iteratively from the nearest-offset trace to the far-offset trace. Far-offset picks (504) may be determined iteratively from the farthest-offset trace to the near-offset trace. It will be readily apparent to a person of ordinary skill in the art how to modify the above algorithm to determine far-offset picks (504) rather than near-offset picks (502).

Coincident picks (506) may be determined from near-offset picks (502) and far-offset picks (504). Coincident picks (506) are determined to exist where near-offset picks (502) and far-offset picks (504) coincide in time and offset.

Figure 6:
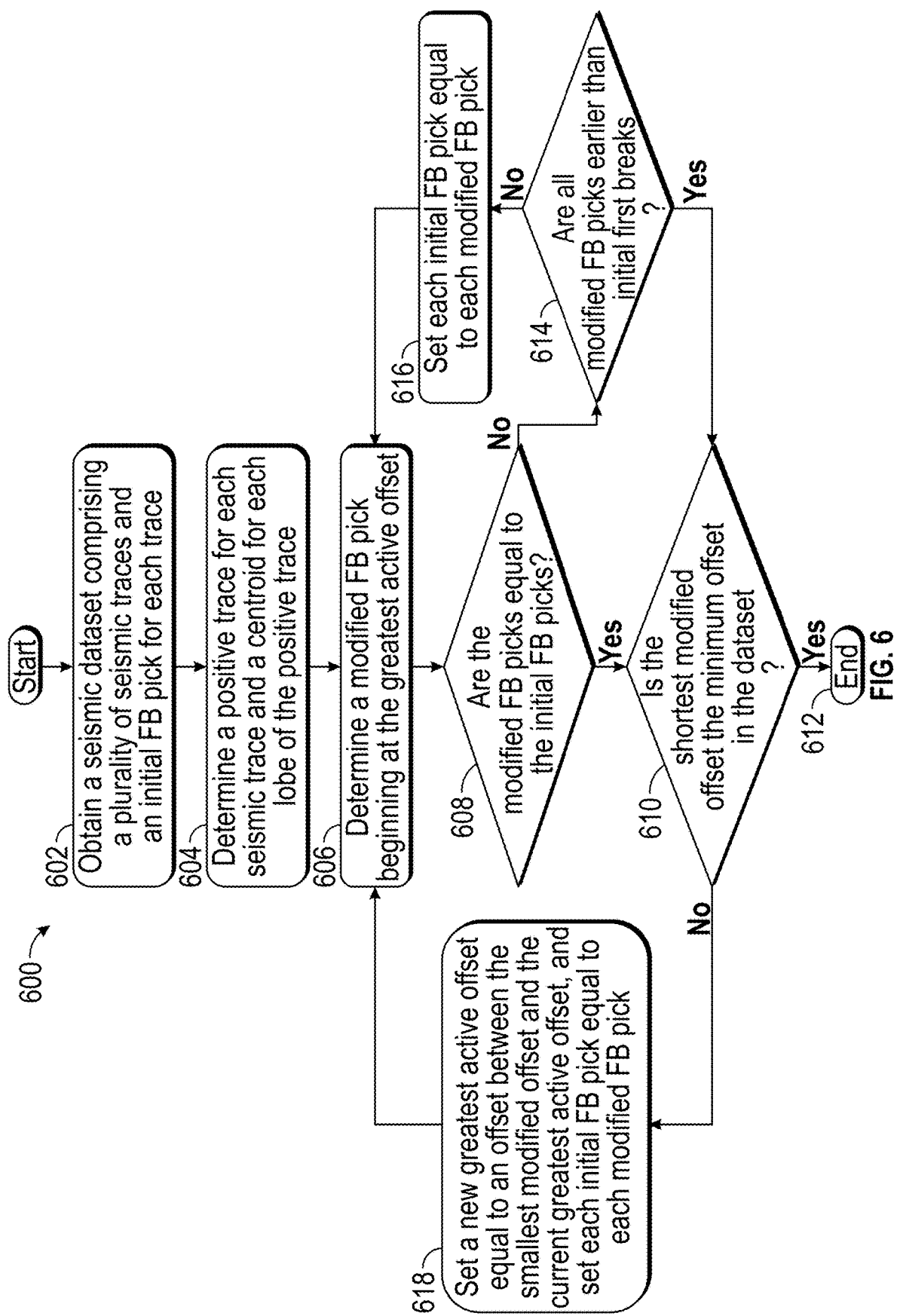
FIG. 6 shows a flowchart of the first break modification in accordance with one or more embodiments.

In accordance with one or more embodiments, FIG. 6 shows a flowchart of the first break modification (600). In Step 602, in accordance with one or more embodiments, a seismic dataset (200) is obtained. The seismic dataset (200) includes a plurality of seismic traces and an initial first break (202) for each trace.

In Step 604, in accordance with one or more embodiments, a positive trace for each of the plurality of seismic traces (300) is determined. In addition, a centroid time (314a-f, 316a-1) for each lobe (308a-q) of the positive trace (306) may be determined.

In accordance with one or more embodiments, in Step 606, a modified first break for each trace (300) beginning at a greatest active offset may be determined. Step 606 is described in greater detail below.

In Step 608, in accordance with one or more embodiments, the first of two stopping criteria may be evaluated. If the modified first breaks are all equal to the initial first breaks, then the flow may progress to Step 610. If the modified first breaks are not all equal to the initial first breaks, then the flow may progress to Step 614.

In Step 610, the second stopping criterion may be evaluated. If the shortest modified offset is the shortest offset (206) in the dataset (500), the workflow may terminate at Step 612. If the shortest modified offset is not the shortest offset (206) in the dataset (500), the workflow may progress to Step 618.

In Step 618, in accordance with one or more embodiments, a new greatest active offset equal to an offset between the smallest modified offset and the current greatest active offset is set, and each initial first break is set to be equal to each modified first break.

From Step 610, in accordance with one or more embodiments, if the shortest modified offset is not the minimum offset in the dataset, a new greatest active offset may be set. The new greatest active offset may be set equal to an offset intermediate between the shortest offset and the current greatest active offset. Further in Step 618, the initial first breaks may be updated to be equal to the modified first breaks and the workflow may proceed to Step 606.

If, in Step 608, the modified first breaks are not all equal to the initial first breaks, then the flow may progress to Step 614. If, in Step 614, all the modified first breaks are earlier than initial first breaks, the workflow may proceed to Step 614. However, if in Step 614, not all the modified first breaks are earlier than initial first breaks, the workflow may proceed to Step 616.

In Step 616, each initial first break may be set equal to the corresponding modified first break before the workflow proceeds to Step 606.

Figure 7:
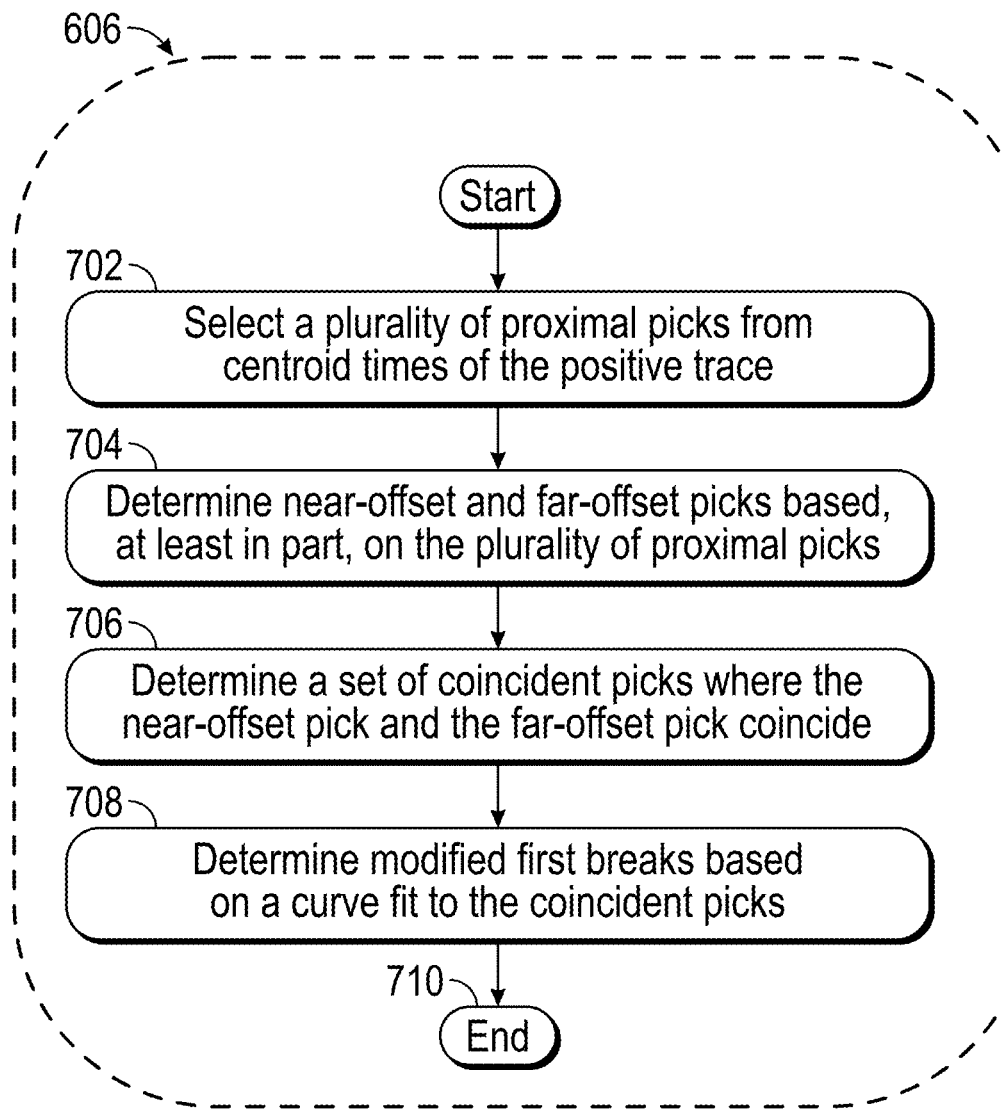
FIG. 7 shows a flowchart in accordance with one or more embodiments.

FIG. 7 shows a flowchart describing Step 606 of FIG. 6 in greater detail. In Step 702, in accordance with one or more embodiments, a plurality of proximal picks (314a-f) for each positive trace (402) may be selected. Each proximal pick may lie in a time window (310) disposed around the first break (312) for the positive trace (306).

In Step 704, near-offset picks (502) and far-offset picks (504) are determined, based, at least in part, on the plurality of proximal picks (314a-f) determined in Step 702. Near-offset picks (502) are selected in an iterative manner, beginning with the proximal picks for the positive trace (306) with the smallest offset, and proceeding by selecting near-offset picks for positive traces (306) with monotonically increasing offsets. In contrast, far-offset picks (504) are selected in an iterative manner, beginning with the proximal picks for the positive trace (306) with the largest offset, and proceeding by selecting far-offset picks for positive traces (306) with monotonically decreasing offsets. Each near-offset pick (502) is selected to minimize its separation in space and time from previously selected near-offset picks (502) in the iterative process. Each far-offset pick (504) is selected to minimize its separation in space and time from previously selected far-offset picks (504) in the iterative process.

In Step 706, in accordance with one or more embodiments, a set of coincident picks (506) are determined from the near-offset picks (502) and far-offset picks (504) is determined. Each coincident pick (506) is determined when the near-offset picks (502) and far-offset picks (504) coincide in time and offset.

In Step 708, in accordance with one or more embodiments, a curve is fitted to the set of coincident picks (506). The fitting may be performed using a method that is robust to the presence of outliers in the fitted coincident picks (506). The fitting may be performed using a random sampling consensus ("RANSAC") method. Further, in Step 708, modified first breaks may be determined from the fitted curves for the offset of each positive trace lying between the coincident pick for the smallest offset positive trace and the coincident pick for the largest offset positive trace.

Figure 8:
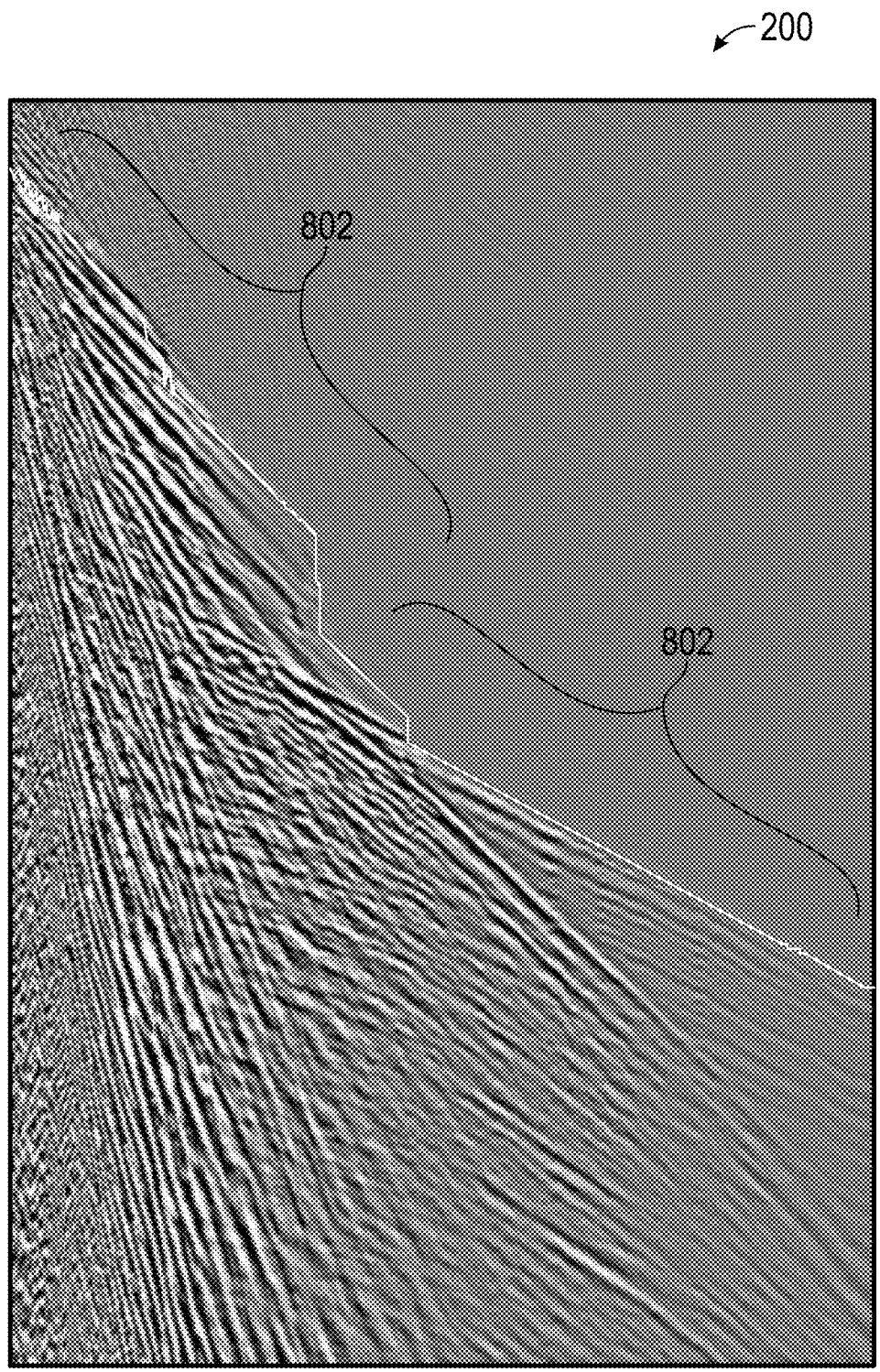
FIG. 8 shows a seismic dataset and the modified first breaks in accordance with one or more embodiments.

FIG. 8 shows the seismic dataset (200) and the modified first breaks (802) in accordance with one or more embodiments. The modified first breaks (802) result from the application of the workflows depicted in FIG. 6 and in FIG. 7 to the seismic dataset (200) and the initial first breaks (202). It will be readily apparent to one of ordinary skill in the art, that the set of modified first breaks (802) contain much less noise and erroneous first breaks than the initial first breaks (202).

Figure 9:
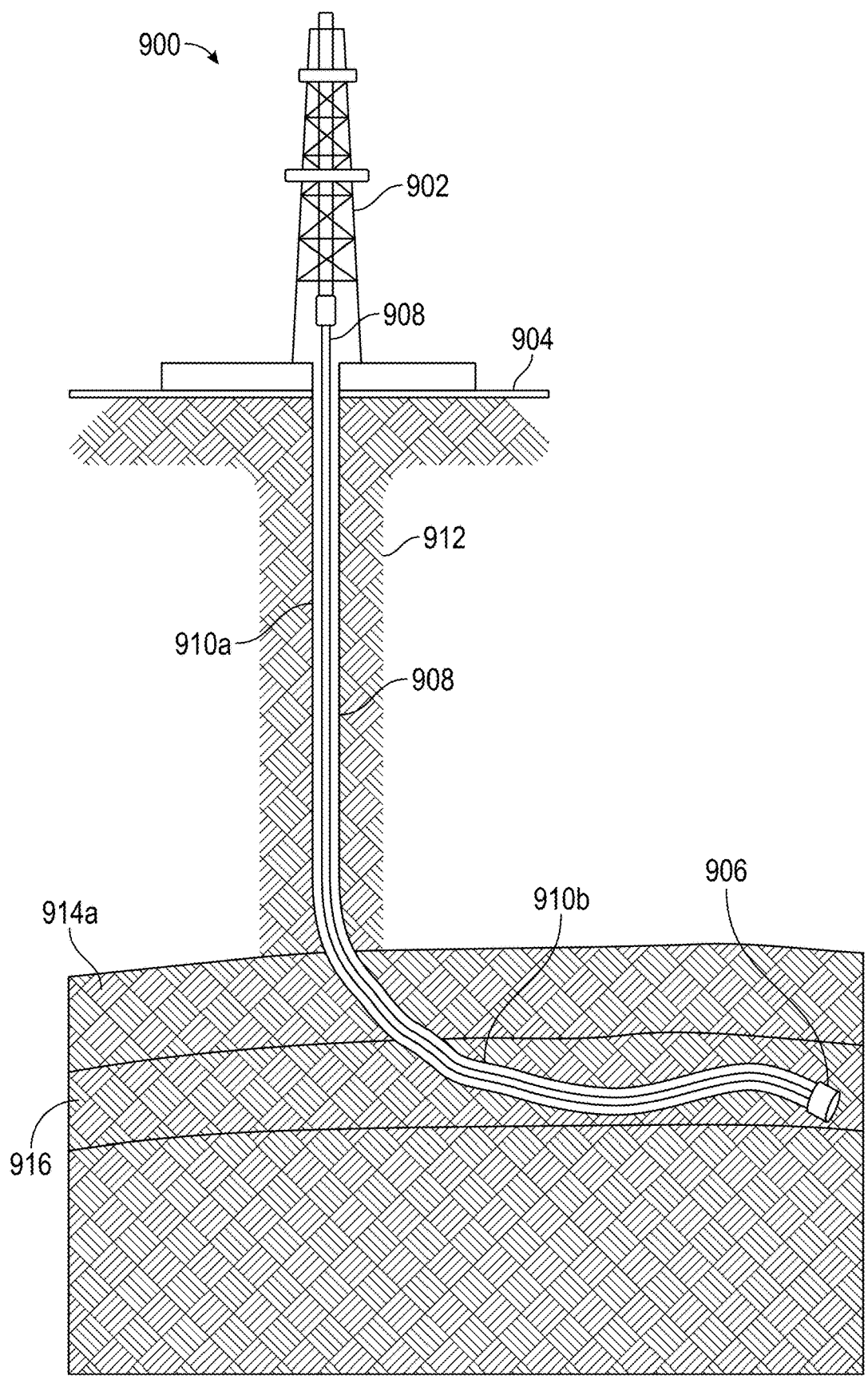
FIG. 9 shows a drilling system in accordance with one or more embodiments.

FIG. 9 shows a drilling system (900) in accordance with one or more embodiments. The drilling system (900) may include a derrick (902). In some embodiments, the derrick (902) may be located on the land surface (904). In other embodiments, the derrick may be located on a jack-up drill rig (not shown), or a floating drill rig (not shown), on a drill ship (not shown). A drill bit (906) suspended by a drill string (906) from the derrick (902) may drill a wellbore (910a, 910b) through the subsurface. In accordance with one or more embodiments, the wellbore may be vertical (910a), highly deviated or horizontal (910b). The wellbore (910a, 910b) may traverse a plurality of overburden layers (912) and one or more cap-rock layers (914). The wellbore (910a, 910b) may penetrate one or more hydrocarbon reservoirs (916). Furthermore, the wellbore path may be planned and drilled, based at least in part, on a targeted hydrocarbon reservoir based, at least in part, on the modified first breaks (802).

Figure 10:
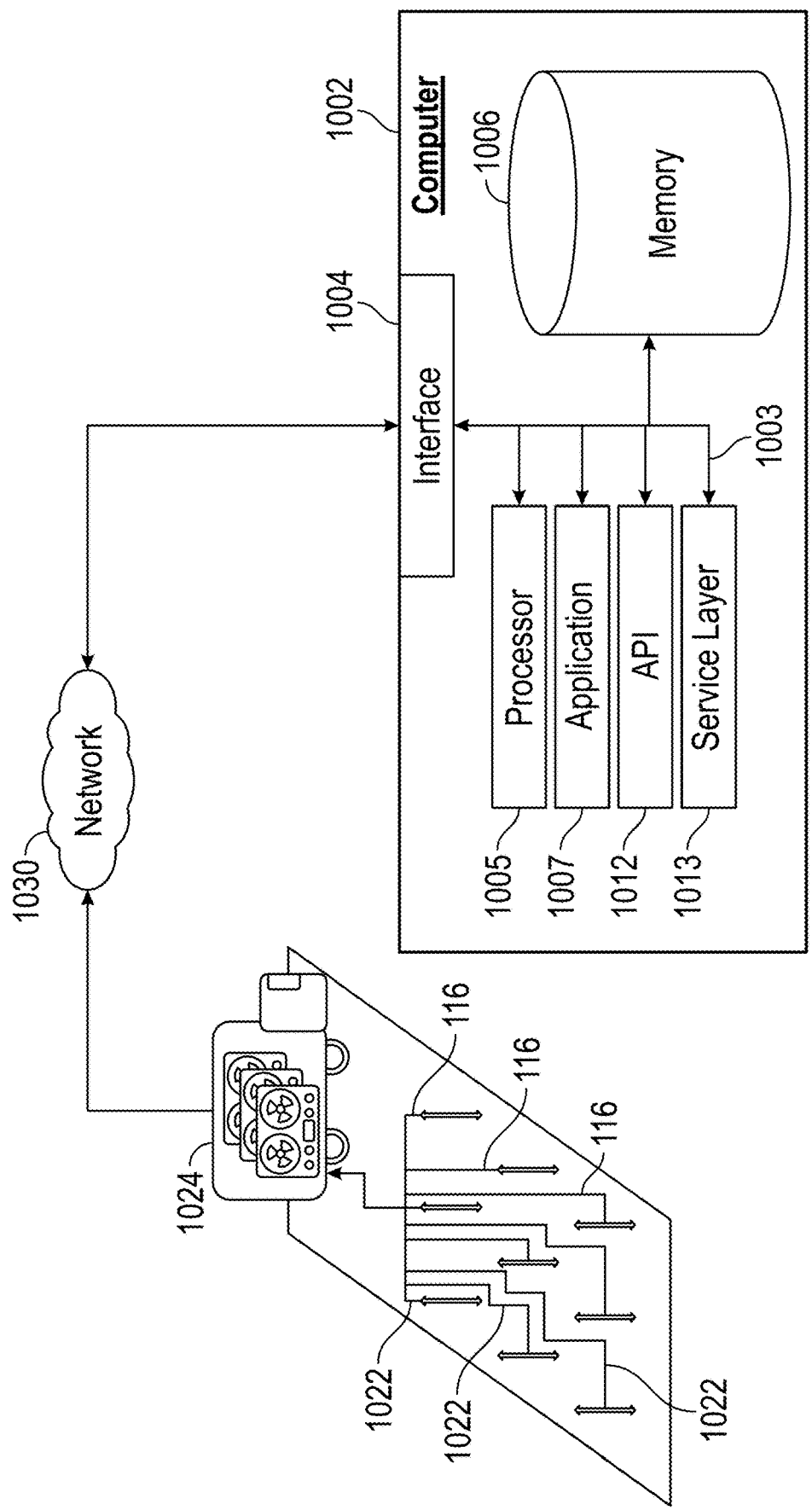
FIG. 10 depicts a system in accordance with one or more embodiments.

FIG. 10 shows a system in accordance with one or more embodiments. The system may further include a seismic recording facility (1024) for recording the seismic dataset (200) recorded by the seismic survey (100) and a seismic processor (1020) that may be located in the seismic recording facility (1024) or may be located at a location remote from the seismic survey (100) and connected to the seismic recording facility (1024) by a network (1030). The seismic processor (1002) may be a computer system configured to process a seismic dataset to determine a set of modified first breaks (802) of the seismic dataset (200).

FIG. 10 further depicts a block diagram of the computer system (1002) used to provide computational functionalities associated with described algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a Graphical User Interface (GUI).

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004 includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a set of first breaks of a seismic dataset generated by a seismic source, comprising:
    obtaining the seismic dataset, wherein the seismic dataset comprises a plurality of seismic traces and a provisional first break for each of the plurality of seismic traces;
    selecting, using a computer processor, a plurality of proximal picks for each seismic trace, wherein each proximal pick lies within a time window enclosing the provisional first break;
    determining, using the computer processor, a near-offset pick for a seismic trace with a shortest offset and sequentially selecting, in order of increasing offset, a first selected trace and determining the near-offset pick for the first selected trace based on proximal picks of the first selected trace and the near-offset pick for at least one seismic trace with a shorter offset than the first selected trace;
    determining, using the computer processor, a far-offset pick for a seismic trace with a farthest offset and sequentially selecting, in order of decreasing offset, a second selected trace and determining a far-offset pick for the second selected trace based on the proximal picks of the second selected trace and the far-offset pick for at least one seismic trace with a farther offset than the second selected trace;
    determining, using the computer processor, a set of coincident picks based on the near-offset pick and the far-offset pick for each seismic trace;
    fitting, using the computer processor, a first break curve to the set of coincident picks;
    determining, using the computer processor, the set of first breaks of the seismic dataset based, at least in part, on the first break curve;
    determining, using the computer processor, a seismic velocity model based, at least in part, on the set of first breaks of the seismic dataset;
    determining, using the computer processor, a seismic image of a subsurface region of interest based, at least in part, on the seismic velocity model;
    planning a wellbore trajectory based, at least in part, on the seismic image, and
    drilling the wellbore trajectory.

2. The method of claim 1, wherein selecting the plurality of proximal picks for each seismic trace comprises:
    forming, using the computer processor, a positive trace from each of the plurality of seismic traces;
    determining, using the computer processor, a centroid time for each of a plurality of lobes of each positive trace; and
    selecting, using the computer processor, for each positive trace, the plurality of proximal picks, wherein each proximal pick comprises one centroid time lying within the time window enclosing the provisional first break.

3. The method of claim 1, wherein the set of first breaks of the seismic dataset comprises a first break for each seismic trace having a coincident near-offset pick and far-offset pick.

4. The method of claim 1, wherein the set of coincident picks comprises a coincident pick for each seismic trace for which the far-offset pick and the near-offset pick are identical.

5. The method of claim 1, wherein the plurality of proximal picks for each seismic trace comprises at least one proximal pick with a time less than a time of an initial first break for that seismic trace and at least one proximal pick with a time greater than the time of the provisional first break for that seismic trace.

6. A non-transitory computer readable medium storing instructions executable by a computer processor, the instructions comprising functionality for:
    receiving a seismic dataset generated by a seismic source, wherein the seismic dataset comprises a plurality of seismic traces and an initial first break for each of the plurality of seismic traces;
    selecting a plurality of proximal picks for each seismic trace, wherein each proximal pick lies within a time window enclosing the initial first break;
    determining a near-offset pick for a seismic trace with a shortest offset and sequentially selecting, in order of increasing offset, a first selected trace and determining the near-offset pick for the first selected trace based on proximal picks of the first selected trace and the near-offset pick for at least one seismic trace with a shorter offset than the first selected trace;
    determining, a far-offset pick for a seismic trace with a farthest offset and sequentially selecting, in order of decreasing offset, a second selected trace and determining a far-offset pick for the second selected trace based on the proximal picks of the second selected trace and the far-offset pick for at least one seismic trace with a farther offset than the second selected trace;
    determining a set of coincident picks based on the near-offset pick and the far-offset pick for each seismic trace;
    fitting a first break curve to the set of coincident picks;
    determining a set of first breaks of the seismic dataset based, at least in part, on the first break curve;
    determining a seismic velocity model based, at least in part, on the set of first breaks of the seismic dataset;
    determining a seismic image of a subsurface region of interest based, at least in part, on the seismic velocity model;
    planning a wellbore trajectory based, at least in part, on the seismic image, and
    drilling the wellbore trajectory.

7. The non-transitory computer readable medium of claim 6, wherein selecting
    the plurality of proximal picks for each seismic trace comprises:
        forming a positive trace from each of the plurality of seismic traces;
        determining a centroid time for each of a plurality of lobes of each positive trace; and
        selecting, for each positive trace, the plurality of proximal picks, wherein each proximal pick comprises one centroid time lying within the time window enclosing a provisional first break.

8. The non-transitory computer readable medium of claim 6, wherein the set of first breaks of the seismic dataset comprises a first break for each seismic trace having a coincident near-offset pick and far-offset pick.

9. The non-transitory computer readable medium of claim 6, wherein the set of coincident picks comprises a coincident pick for each seismic trace for which the far-offset pick and the near-offset pick are identical.

10. The non-transitory computer readable medium of claim 6, wherein the plurality of proximal picks for each seismic trace comprises at least one proximal pick with a time less than a time of an initial first break for that seismic trace and at least one proximal pick with a time greater than the time of a provisional first break for that seismic trace.

11. A system comprising:
a seismic acquisition system; and
a seismic processor configured to:
receive a seismic dataset generated by a seismic source, wherein the seismic dataset comprises a plurality of seismic traces from the seismic acquisition system;
determine an initial first break for each of the plurality of seismic traces;
select a plurality of proximal picks for each seismic trace, wherein each proximal pick lies within a time window enclosing the initial first break;
determine a near-offset pick for a seismic trace with a shortest offset and sequentially selecting, in order of increasing offset, a first selected trace and determining the near-offset pick for the first selected trace based on proximal picks of the first selected trace and the near-offset pick for at least one seismic trace with a shorter offset than the first selected trace;
determine, a far-offset pick for a seismic trace with a farthest offset and sequentially selecting, in order of decreasing offset, a second selected trace and determining a far-offset pick for the second selected trace based on the proximal picks of the second selected trace and the far-offset pick for at least one seismic trace with a farther offset than the second selected trace;
determine a set of coincident picks based on the near-offset pick and the far-offset pick for each seismic trace;
fit a first break curve to the set of coincident picks;
determine the set of first breaks of the seismic dataset based, at least in part, on the first break curve;
determine a seismic velocity model based, at least in part, on the set of first breaks of the seismic dataset;
determine a seismic image of a subsurface region of interest based, at least in part, on the seismic velocity model;
plan a wellbore trajectory based, at least in part, on the seismic image, and
drill the wellbore trajectory.

12. The system of claim 11, wherein selecting the plurality of proximal picks for each seismic trace comprises:
forming a positive trace from each of the plurality of seismic traces;
determining a centroid time for each of a plurality of lobes of each positive trace; and
selecting for each positive trace, the plurality of proximal picks, wherein each proximal pick comprises one centroid time lying within the time window enclosing a provisional first break.

13. The system of claim 11, wherein the set of first breaks of the seismic dataset comprises a first break for each seismic trace having a coincident near-offset pick and far-offset pick.

14. The system of claim 11, wherein the set of coincident picks comprises a coincident pick for each seismic trace for which the far-offset pick and the near-offset pick are identical.

* * * * *